May 21, 1968   R. C. SEAMANS, JR   3,383,922
DEPUTY ADMINISTRATOR OF THE NATIONAL
AERONAUTICS AND SPACE ADMINISTRATION
LINEAR DIFFERENTIAL PRESSURE SENSOR
Filed July 27, 1966   3 Sheets-Sheet 1

AARON G. LOUGHEAD,
JAMES F. MILLIKEN,
INVENTORS

BY

ATTORNEYS

May 21, 1968  R. C. SEAMANS, JR  3,383,922
DEPUTY ADMINISTRATOR OF THE NATIONAL
AERONAUTICS AND SPACE ADMINISTRATION
LINEAR DIFFERENTIAL PRESSURE SENSOR
Filed July 27, 1966  3 Sheets-Sheet 2

AARON G. LOUGHEAD,
JAMES F. MILLIKEN,
INVENTORS

BY
ATTORNEYS

May 21, 1968  R. C. SEAMANS, JR  3,383,922
DEPUTY ADMINISTRATOR OF THE NATIONAL
AERONAUTICS AND SPACE ADMINISTRATION
LINEAR DIFFERENTIAL PRESSURE SENSOR
Filed July 27, 1966  3 Sheets-Sheet 3

AARON G. LOUGHEAD,
JAMES F. MILLIKEN,
INVENTORS

BY

ATTORNEYS

United States Patent Office 3,383,922
Patented May 21, 1968

3,383,922
LINEAR DIFFERENTIAL PRESSURE SENSOR
Robert C. Seamans, Jr., Deputy Administrator of the National Aeronautics and Space Administration, with respect to an invention of Aaron G. Loughead and James F. Milliken, both of Huntsville, Ala.
Filed July 27, 1966, Ser. No. 568,354
8 Claims. (Cl. 73—419)

ABSTRACT OF THE DISCLOSURE

A linear differential pressure sensor is disclosed including a receptacle having a hollow interior and having a first port opening in one end and a second port opening in the opposed end. A slidable element is received within the hollow interior of the receptacle and is adapted to slide along an axis of translation between one end of the receptacle and the other end of the receptacle in response to a difference in pressure applied to the first port opening and second port opening. Detecting means responsive to the position of the slidable element are provide for producing a control signal which varies with the position of the slidable element. Tilt mechanisms means are provided for supporting and varying the angle of inclination of the receptacle in accordance with the control signal so as to cause an axial component of the force of gravity to be applied to the slidable element to balance the forces acting on the slidable element. Readout means are connected to the tilt mechanisms for providing a signal which varies directly with the sine of the angle of inclination necessary to balance the forces acting on the slidable element. The difference in pressure between the first and second pressure is a linear function of the sine of this angle of inclination.

---

The invention described herein was made in the performance of work under a NASA contract and is subject to the provisions of section 305 of the National Aeronautics and Space Act of 1958, Public Law 85–568 (72 Stat. 435; 42 U.S.C. 2457).

Background of the invention

The present invention relates to the measurement of pressures and more particularly to a differential pressure sensing device wherein differential pressures of the order of a few pounds per square inch may be measured. Though the invention is not limited thereto such small differential pressure sensors are particularly adapted to be used in a tanking system for maintaining the liquid levels of very light liquids, such as liquid hydrogen, at a constant level. In such a system the small differential pressure sensor would be employed to measure the difference in pressure between the top and bottom of the tank containing the liquid hydrogen. As the depth of liquid in a tank is directly proportional to the difference in pressure between the top and the bottom of the tank the differential pressure sensing device would be used as the means to sense the liquid level to obtain a control signal which would control the valves feeding the tank.

In the past, in such a tanking system, it has been the general practice to employ either liquid manometers or large force-balanced diaphragms having the sensitivity to measure a small differential pressure. However, these devices have not proven entirely satisfactory under all conditions for the reason that considerable difficulty has been encountered in obtaining the required degree of sensitivity without sacrificing reliability or without sacrificing the ability to automate the system.

For example, with manometer differential pressure sensors, which consist of a tube or container in which a liquid can be forced to flow against gravity in response to the difference in pressure on the upper and lower surfaces, it is necessary to use light fluid to obtain the desired degree of sensitivity. However as a result of this limitation, sudden pressure surges can easily drive the light manometer fluid into the sensor lines with resultant loss of calibration. The second undesirable result is that the use of a light fluid in the manometer makes the system extremely difficult to automate because the meniscus formed by the fluid in the manometer tube makes the fluid level undeterminate to the presently used readout equipment.

If diaphragm sensors are utilized, which depend for their operation on an elastic diaphragm that moves or deforms in accordance with the pressure applied, it is necessary that the diaphragm be large enough and flexible enough to provide the desired sensitivity. This has resulted however, in a diaphragm sensor in which the elastic element is easily destroyed or knocked out of calibration by sudden pressure surges. Another limitation that one encounters with diaphragm sensors is that an error is introduced into the system as the result of the inherent hysteresis of large diaphragms.

Accordingly it is an object of the present invention to provide a device capable of accurately measuring the difference in two pressures of very nearly equal value.

A further object of the invention is to provide a device in which destruction or loss of calibration is not caused by sudden pressure surges.

Another object is to provide a differential pressure sensor which is easily automated.

Summary of the invention

Briefly stated and in accordance with the present invention a differential pressure sensor is constructed in which the two pressures whose difference is to be measured are applied to opposite ends of a piston of known mass, slidably contained for translation along a single axis within a hollow receptacle. The piston and receptacle, hereinafter referred to as the pendulum unit, are supported by a tilting mechanism which is capable of varying the angle of inclination of the pendulum unit so that a variable component of the force of gravity can be applied axially to an end of the piston. If the pendulum unit is orginally supported in a horizontal position and a differential pressure exists between the two applied pressures a resultant force will be applied to and displace the piston from its null position.

Coupled to the pendulum unit are sensing means which indicate the direction of this displacement and which actuate control means which balance the force caused by the differential pressure with an equal but opposite force. The control means accomplishes the balancing of the forces acting on the piston by varying the angle of inclination of the tilt mechanism and of the pendulum unit so that a variable component of the force of gravity is applied axially to the piston. At some particular angle the two forces acting on the piston will be equal but opposite. Readout means are then provided to indicate the angle of inclination of the pendulum unit at which balance occurs, for as will be mathematically verified later, the differential pressure is a linear function of this angle.

Description of the drawings

The invention, both as to its organization and operation together with further objects and advantages thereof may best be understood by reference to the following description taken in connection with the accompanying drawings in which.

Description of the preferred embodiment

Figure 1:
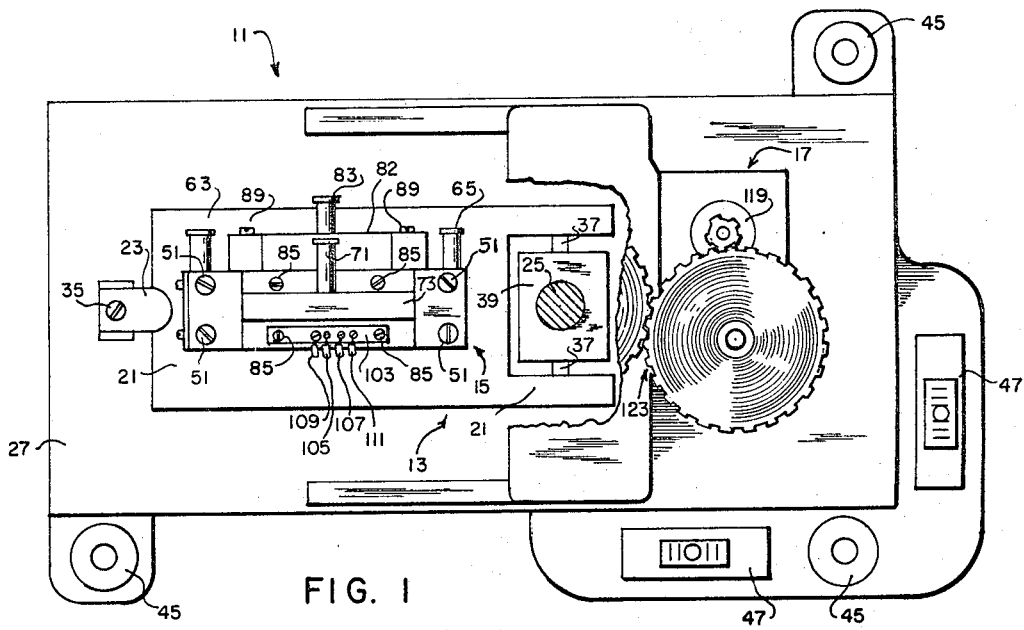
FIGURE 1 is a top plan view of the linear differential pressure sensor according to one embodiment of the present invention with parts broken for greater clarity.
Figure 2:
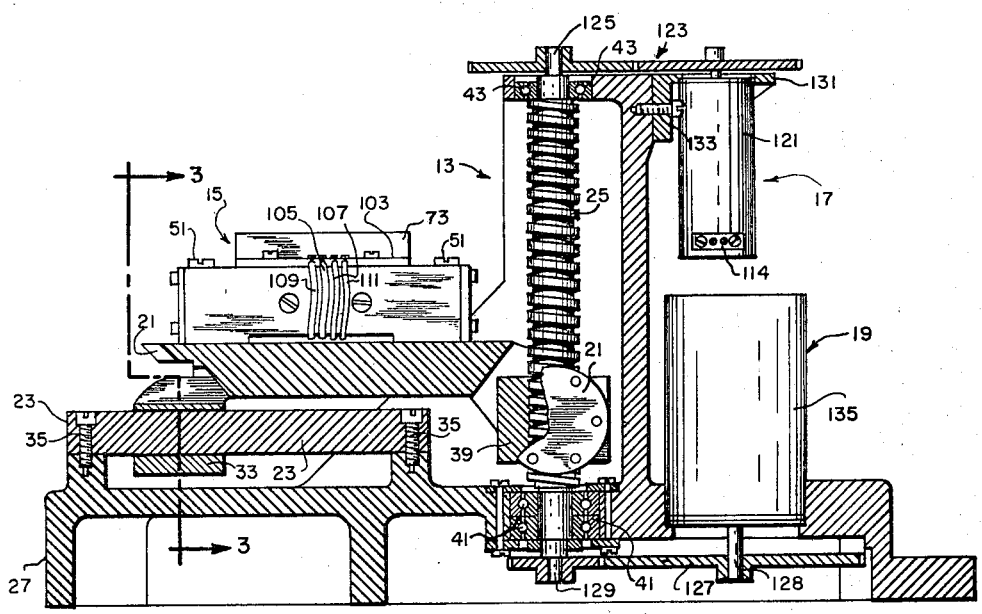
FIGURE 2 is a front elevation view partly in section, of the linear differential pressure sensor of FIGURE 1.

Referring now to the drawings wherein like reference characters designate like or corresponding parts throughout the several views, there is shown in FIGURES 1 and 2 an illustrative form of the linear differential pressure sensor 11 consisting of a tilt mechanism section 13 supporting a pendulum unit 15 and control section 17 for regulating the angle of inclination of the tilt mechanism. A readout unit 19 (shown in FIGURE 2) provides a signal directly responsive to the angle of inclination of the pendulum unit.

Figure 3:
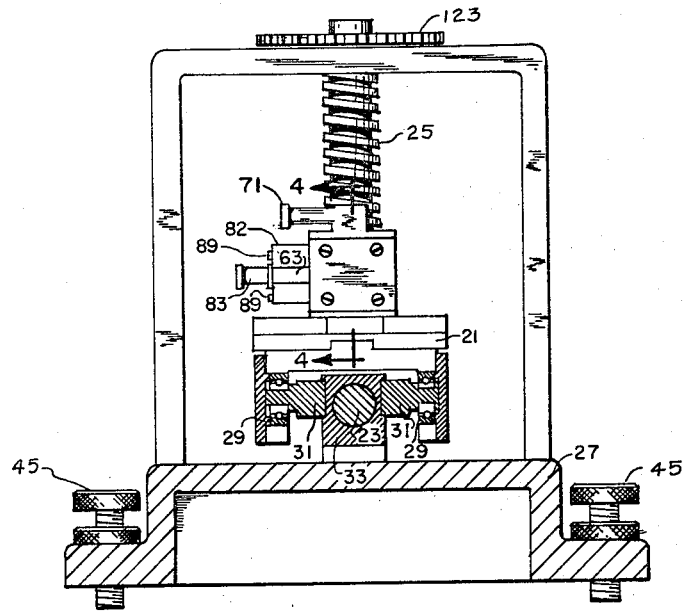
FIGURE 3 is a sectional end view taken along line 3—3 in FIGURE 2.

The tilt mechanism 13, as shown partly in section in FIGURE 2, consists generally of a hypotenuse bar 21, slide bar 23, worm gear 25 and frame 27. The left end of the hypotenuse bar 21 is pivoted on ball bearing race 29 (FIGURE 3) which are rotatably mounted on spindles 31 of sleeve 33. Sleeve 33 is slideably mounted on slide bar 23 which is affixed to frame 27 by screws 35 so that the hypotenuse bar 21 can both rotate and slide relative to slide bar 23. The right end of the hypotenuse bar 21 is similarly rotatably mounted to spindles 37 (FIGURE 1), which are affixed to traveling nut 39 on worm gear 25. Slide bar 23, which comprises a base element, and worm gear 25 are held at right angles to each other by cast frame 27 and by ball bearing race 41 which supports the worm gear 25 axially and radially at the lower end and ball bearing race 43 which positions the upper end of the worm gear. Pendulum unit 15 is supported in parallel relationship to the hypotenuse bar 21 and is affixed thereto by screws 51.

Leveling screws 45 and precision bubble levels 47 (FIGURE 1) are provided to adjust slide bar 23 to horizontal and worm gear 25 to vertical. As the worm gear 25 and slide bar 23 are always at right angles to each other, it is seen that a right triangle is formed with the angle between the hypotenuse bar 21 and slide bar 23; hereinafter referred to as the angle of inclination, determined by the position of the traveling nut 39 on worm gear 25.

Figures 4, 5:
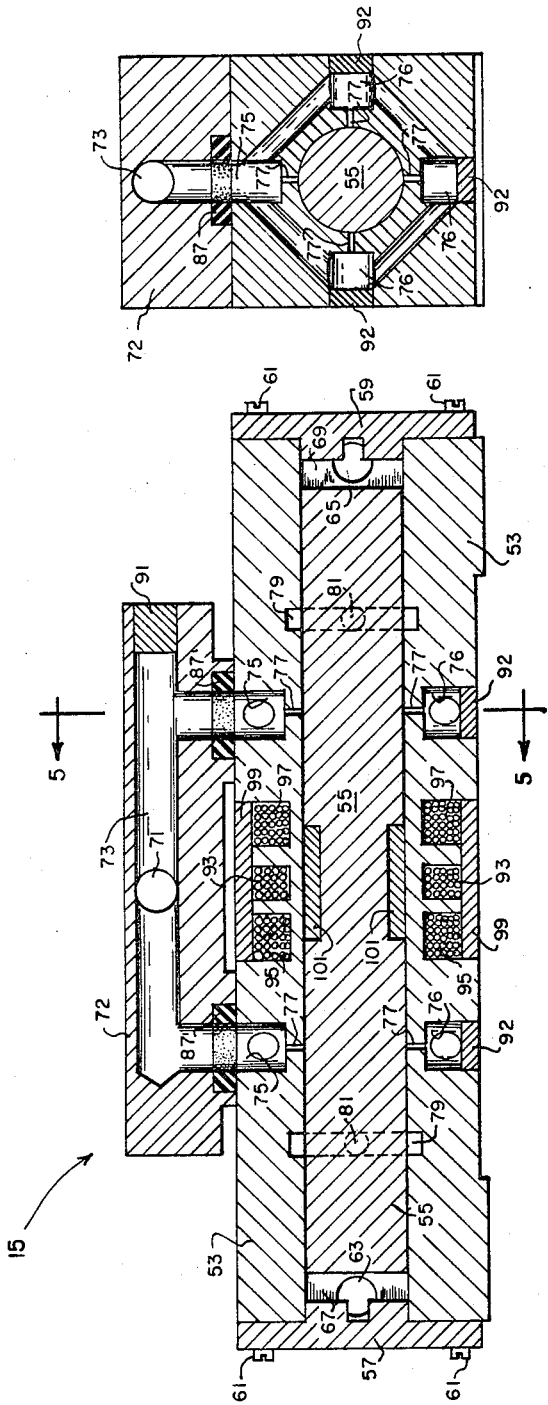
FIGURE 4 is a sectional view of the pendulum unit taken along line 4—4 in FIGURE 3.
FIGURE 5 is a sectional view taken along line 5—5 in FIGURE 4.

Referring now to FIGURE 4, the pendulum unit 15 is shown to consist of an elongated cylinder 53 having a hollow body and a piston 55 of known weight, slidably received within the hollow body and adapted to slide on a single axis of translation from end cap 57 to end cap 59, which end caps are affixed to cylinder 53 by screws 61. Ports 63 and 65 are adapted to be connected to the two pressures whose difference is to be measured and allow the two pressures to enter the cylinder 53 and pressure chambers 67 and 69 so as to exert a force on the respective ends of the piston.

The ends of the piston 55 are of equal cross-sectional area and the piston is substantially frictionlessly supported in cylinder 53 by means of a pressurized gas bearing. This bearing is formed by pressurized gas entering the cylinder through port 71 in manifold 72 to chamber 73 thence to intake chamber 75 and distribution chambers 76 (FIGURE 5) and through orifices 77. After the gas passes through the orifices it spreads out to form a thin film of gas which radially supports the piston and passes out through radial exhaust grooves 79 to ports 81 and thence to exhaust manifold 82 (FIGURE 1) and exhaust connector 83. Screws 89 hold the exhaust manifold 82 in proper position on cylinder 53 and screws 85 hold manifold chamber 73 in proper position on cylinder 53. As shown in FIGURE 4 chambers 75 are sealed by gaskets 87 and plug 91 is inserted in the end of chamber 73. Also plugs 92 are inserted in the ends of distribution chambers 76.

Because the piston is substantially frictionlessly held in cylinder 53 by the pressurized gas bearing it is seen that if pressures of very nearly equal value are introduced into pressure chambers 67 and 69, the piston will respond to the differential pressure by being displaced from its original position in a direction away from the greater of the two pressures.

A differential transformer which forms part of the tilt mechanism control section is provided to sense the direction of this movement of the piston and is also shown in FIGURE 4. The differential transformer consists of energized coil 93 which comprises a primary winding and sensing coils 95 and 97 which comprise secondary windings connected series opposed. The coils are wound perpendicular to the cylinder 53 axis in circumferential slots within cylinder 53 and are covered with an epoxy 99. A soft magnetic split sleeve 101 on the piston comprises the core of the differential transformer. So as not to interfere with the transformer action of coils 93, 95, 97 piston 55 must be of a non-magnetic material and the cylinder must be both non-magnetic and of a high electrical resistance material. As shown in FIGURES 1 and 2 terminal board 103 provides connections for leads 105 and 107 of the energized coil 93 and for leads 109 and 111 of sensing coils 95 and 97.

Figure 6:
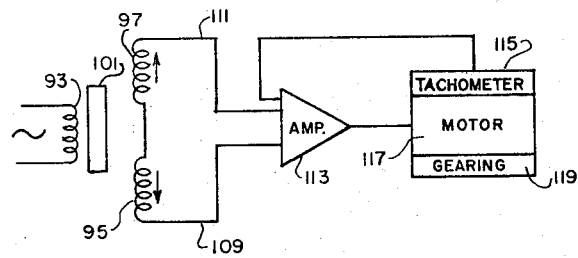
FIGURE 6 is a block diagram of the tilt mechanism control section of the linear differential pressure sensor.

The operation of the differential transformer is best understood by reference to FIGURE 6. As shown the center coil 93 is energized by an applied A-C voltage. Sensing coils 95 and 97 are linked to the magnetic flux from coil 93 by the magnetic sleeve 101 in such a manner that if the sleeve is centered axially between the sensing coil equal voltages are induced in the sensing coils, but as the voltages are 180 degrees out of phase, as indicated by the arrows, the net or differential output will be zero. However, when the sleeve 101 is displaced from this null position, the voltage induced in one of the sensing coils will increase and will decrease in the other sensing coil. For example, if piston 55 and sleeve 101 move to the right in FIGURE 4 corresponding to an upward movement of sleeve in FIGURE 5, the magnetic coupling between coils 93 and 97 will increase and the magnetic coupling between coils 93 and 95 will decrease. As a result greater voltage will be induced in winding 97 than in winding 95 and a resultant voltage will appear between leads 109 and 111. Should the piston 55 and sleeve 101 move in the opposite direction a similar resultant voltage will appear between leads 109 and 111, however, as the sensing coils are connected series opposed this voltage will be 180 degrees out of phase with the resultage voltage occurring on a movement of the piston and sleeve to the right in FIGURE 4.

As shown in FIGURE 6 the voltage appearing between leads 109 and 111, which has been disclosed to be both indicative of a movement of the piston and the direction of the movement, is applied to amplifier 113. The amplified output is applied to energize bi-directional motor 117 which drives gear 119 in a direction dependent on the phase of the output signal of the differential transformer. A tachometer generator 115 which is driven by the motor 117 feeds back, in accordance with established servo practice a rate signal to amplifier 113 to damp the operation of the motor 117. In this manner both the movement and the direction of movement of piston 55 are translated into a correspondini rotation of gear 119.

Referring now to FIGURE 2 there is shown container 121 which supports amplifier 113, motor 117, and tachometer 115 and is affixed to frame 27 by flange 131 and screws 133 in such a manner as to engage gear 199 (FIGURE 1) with gear train 123. Gear train 123 provides the means for translating the output of the motor 117 to the appropriate rotation of worm gear 25 as the gear train is attached to the spindle 125 of the worm gear. Terminal board 114 on container 121 provides the means to connect leads 109 and 111 of the differential transformer to the amplifier supported within container 112.

To provide an indication of the angle of inclination of the pendulum unit 15 a readout unit 19 consisting of a 10-turn potentiometer 135 has its slide (not shown) coupled to worm gear 25 by spindle 129, gear train 127 and shaft 128. As the spindle 129 is coupled to worm gear 25 a rotation of the worm gear will cause a corresponding rotation of the slide of potentiometer 135. If the potentiometer is energized by a regulated D.C. voltage a voltage output may be obtained from the potentiometer which is a linear function of the rotation of the worm gear.

The operation of the linear differential pressure sensor constructed in accordance with the teachings of the invention may be explained with reference to FIGURE 4 and FIGURE 2. In use the greater of the two pressures whose difference is to be measured is introduced into port 63 and the smaller of the two pressures into port 65 by flexible tubing (not shown).

If the pendulum unit 15 is originally held in a horizontal position by hypotenuse bar 21 as shown in FIGURE 2 the piston 55 will move to the right due to the differential pressure applied. As previously explained this displacement will cause an output voltage to appear between leads 109 and 111 of the differential transformer which will actuate the motor means to drive gear train 123. This in turn will cause worm gear 25 to rotaate in such a manner that traveling worm nut 39 is moved upward. With an upward movement of the nut 39 the angle of inclination of the pendulum unit 17 and hypotenuse bar 21 will be increased since the right end of the hypotenuse bar is rotatably mounted on travelling nut 39 and the left end of the hypotenuse bar is rotatably and slidably mounted on slide bar 23. As the motor 117 will remain actuated as long as the piston 55 is displaced from its null position the pendulum unit will continue to be tilted at succeedingly greater angles until it is returned to its original position by the axial component of the force of gravity acting on the piston and by the axial force due to the magnetic field produced by the currents in coils 93, 95 and 97. At some particular angle of tilt the piston will return to its original position causing the output of the differential transformer to again be zero thereby causing motor 117 to stop rotation of worm gear 25. Since the piston is substantially frictionlessly held within the cylinder by the pressurized gas bearing and the magnetic force field produced by current in coils 93, 95 and 97 will cancel itself out due to the now equal but 180 degrees out of phase currents in coils 95 and 97 only two forces will be acting on the piston.

The first force is that due to the differential pressure and may be written:

$$F_1 = (P_2 - P_1)A \tag{1}$$

wherein $P_2$ is the greater pressure, $P_1$ is the smaller pressure and A is the cross sectional area of the ends of the piston.

The second force is the axial component of the force of gravity and may be written:

$$F_2 = Mg \sin \theta \tag{2}$$

wherein $Mg$ is the weight of piston 55 and $\theta$ is the angle of inclination of the pendulum unit.

Since the weight and cross sectional end area of the piston are known constants and the two forces are equal Equations 1 and 2 may be combined as:

$$P_2 - P_1 = K \sin \theta \tag{3}$$

Since $$\sin \theta = \frac{d}{L} \tag{4}$$

where $d$ equals the distance the traveling nut 39 on the worm gear is from the traveling nut position when hypotenuse bar 21 is horizontal and L equals the length from the center of slide 33 to nut 39. Equation 3 may now be written as:

$$P_2 - P_1 = kd/L \tag{5}$$

or $$P_2 - P_1 = \frac{k\delta\phi}{L} \tag{6}$$

wherein $\delta$ is the lead of the worm gear 25 and $\phi$ is the angle through which the worm gear 25 is turned from its position where the hyptotenuse bar 21 and pendulum unit 15 are horizontal.

From Equation 3 it is readily seen that the difference in pressure is a linear function of the sine of the angle of tilt of the hypotenuse bar and from Equation 6 it is also seen that the difference in pressure is a linear function of $\phi$ the angle through which worm gear 25 is turned as the other parameters of the system remain conveniently invariable.

To provide a control signal which varies directly with $\phi$ and the differential pressure, the slide of the 10-turn potentiometer 135 is driven by the worm gear 25 through gear train 127 and shaft 128. As the total angular rotation of the worm gear 25 is indicated by the position of the slide on the potentiometer an output potential will be generated which as a linear relationship between it and the differential pressure.

In continuous operation in a system where the differential pressure varies with time, the angle of inclination of the pendulum unit 15 and the output signal of the potentiometer will vary with the change in differential pressure. For example if the differential pressure decreases the piston will be displaced in such a direction as to cause tilt mechanism control 17 to drive worm gear 25 in such a manner as to reduce the axial component of the force of gravity acting on the piston. In this manner the two forces acting on the piston are again balanced and the change in the angle of inclination of the pendulum unit necessary to obtain this balance will be reflected in a corresponding change in the output of potentiometer 135.

From the foregoing it is seen that a linear differential pressure sensor has been disclosed that may be utilized to provide a continuous indication of the difference in pressure between two pressures of very nearly equal value and in which automation is easily accomplished.

Additionally it can be readily seen that the linear differential pressure sensor is not adversely affected by sudden pressure surges.

Although the embodiment of the invention has been described and illustrated utilizing a potentiometer driven by the worm gear to provide a signal indicative of the angle of inclination of the pendulum it is believed evident to those skilled in the art that other angle determining means could be utilized without departing from the scope and spirit of the invention. Since this and many other variations are considered within the realm of those skilled in the art without departing from the teaching of the present invention, this invention should be considered as being limited only according to the following appended claims.

What is claimed is:

1. A linear differential pressure sensor comprising:
   a pendulum unit including a receptacle having a hollow interior with a first port opening in one end and a second port opening in the opposed end for admitting respectively a first and second pressure and a slidable element received within the hollow interior of said receptacle and adapted to slide along an axis of translation between one end of the receptacle having said first port opening and the other end of the receptacle having said second port opening;
   detecting means responsive to the position of said slidable element for producing a control signal which is a function of the forces acting on said slidable element along said axis of translation; and tilt mechanism means supporting said pendulum unit and responsive to said control signal for varying the angle of inclination of said pendulum unit and the axial component of the force of gravity acting on said slidable element to balance the forces acting on said slidable element.

2. A linear differential pressure sensor as claimed in claim 1 including readout means operatively coupled to said tilt mechanism means for providing a signal which varies directly with the sine of the angle of inclination of said tilt mechanism means.

3. A linear differential pressure sensor as claimed in claim 2 including bearing means for substantially frictionlessly supporting said slidable element within said receptacle.

4. A linear differential pressure sensor as claimed in claim 3 in which said bearing means comprises a pressurized gas bearing.

5. A linear differential pressure sensor as claimed in claim 3 wherein said detecting means comprises an electrical signal generator biasing said slidable element to a null position and producing a control signal which is a function of the direction of displacement of said slidable element from its null position.

6. A linear differential pressure sensor as claimed in claim 5 wherein said electrical signal generator comprises a differential transformer having a primary winding and first and secondary windings connected series opposed mounted on said receptacle and having a magnetic core mounted on said slidable element.

7. A linear differential pressure sensor as claimed in claim 5 wherein said tilt mechanism means comprises:

a hypotenuse bar, a base element, a worm gear having a traveling nut, frame means holding said worm gear and said base element at right angles, first means rotatably and slidably mounting one end of said hypotenuse bar to said base element, second means rotatably mounting the opposed end of said hypotenuse bar to said traveling nut and gear means coupled to said worm gear for rotating said worm gear; and an amplifier having its input connected to the output of said electrical signal generator, a bidirectional motor connected to the output of said amplifier and having its output coupled to said gear means and having its direction of rotation dependent on the direction of displacement of said slidable element from its null position.

8. A linear differential pressure sensor as claimed in claim 7 wherein said readout means comprises:

a potentiometer having its slide rotatably driven by said worm gear.

References Cited

UNITED STATES PATENTS

| | | | |
|---|---|---|---|
| 3,100,858 | 8/1963 | Topazio et al. | 340—187 |
| 3,260,118 | 7/1966 | Douslin | 73—419 |

OTHER REFERENCES

Article by Hutton entitled "A Tilting Air-Lubricated Piston Gage for Pressures Below One-Half Inch of Mercury," Journal of Research of the National Bureau of Standards, vol. 63C, No. 1, pages 47–50, July-September 1959.

DAVID SCHONBERG, *Primary Examiner.*

D. E. CORR, *Assistant Examiner.*